Figure 1:
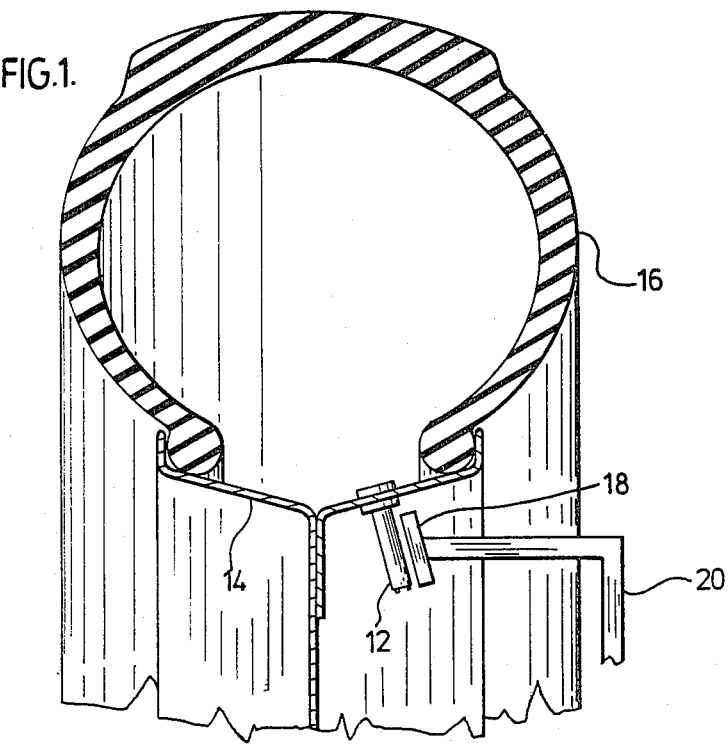

United States Patent [19]

Sarides

[11] 4,348,896

[45] Sep. 14, 1982

[54] APPARATUS FOR INDICATING PRESSURE IN PNEUMATIC TIRES

[76] Inventor: Athanase K. Sarides, 88 Baroness Crescent, Willowdale, Ontario M1P 4T6, Canada

[21] Appl. No.: 190,124

[22] Filed: Sep. 24, 1980

[51] Int. Cl.³ .............................................. B60C 23/02
[52] U.S. Cl. ...................................... 73/146.5; 340/58
[58] Field of Search ...................... 73/146.5, 729, 730, 73/731, 753; 340/58

[56] References Cited

U.S. PATENT DOCUMENTS

| | | | |
|---|---|---|---|
| 1,744,590 | 1/1930 | Sutherland | 73/731 |
| 2,790,155 | 4/1957 | Lucia et al. | 340/58 |
| 4,157,530 | 6/1979 | Merz | 73/146.5 X |

*Primary Examiner*—Jerry W. Myracle

*Attorney, Agent, or Firm*—Robert F. Delbridge; Arne I. Fors

[57] ABSTRACT

Apparatus for indicating pressure in a pneumatic tire on a wheel while in motion on a vehicle, includes an actuator secured to the wheel so as to rotate therewith. The actuator has an extendible bag member in communication with air in the tire, a spring controlling extension of the bag by air in the tire to cause the bag member to be extended by an amount indicative of the air pressure in the tire, and a magnet positioned in accordance with the amount of extension of the bag member and therefore in accordance with the air pressure in the tire. A series of magnetically actuated switches are mounted on the vehicle for selective actuation by the magnet in accordance with the position of the magnet as it rotates with the tire, and indicators connected to the magnetically actuated switches indicate air pressure in the tire by indicating the magnetically actuated switch selectively actuated.

5 Claims, 3 Drawing Figures

APPARATUS FOR INDICATING PRESSURE IN PNEUMATIC TIRES

This invention relates to apparatus for indicating pressure in a pneumatic tire on a wheel while the wheel is in use on a vehicle.

It is useful for the driver of a vehicle to have some indication of the pressures in the tires on the wheels of the vehicle while the vehicle is in motion. Various proposals have been made in the past for apparatus of this nature, but for one reason or another such known proposals have not been commercially successful. It is therefore an object of the invention to provide improved apparatus of this kind.

The present invention provides apparatus for indicating pressure in a pneumatic tire on a wheel while in motion on a vehicle. The apparatus comprises an actuator secured to the wheel so as to rotate therewith, the actuator including an extendible bag member in communication with air in the tire, resilient means controlling extension of the bag by air in the tire to cause the bag member to be extended by an amount indicative of the air pressure in the tire, and magnetic means positioned in accordance with the amount of extension of the bag and therefore in accordance with the air pressure in the tire. A plurality of magnetically actuated means is mounted on the vehicle for selective actuation by the magnetic means of the actuator in accordance with the position of the magnetic means as it rotates with the tire. Indicating means are connected to the magnetically actuated means to indicate air pressure in the tire by indicating the magnetically actuated means selectively actuated.

Such apparatus is relatively simple, and provides a continuous indication of tire pressures to the driver of a vehicle while it is in motion.

The resilient means may comprise a helical spring surrounding the extendible bag member and secured to the magnetic means, the spring acting to urge the magnetic means against the bag member to control extension of the bag member.

The indicating means may comprise a series of indicators each associated with a respective magnetically actuated means, each indicator being operated by actuation of the associated magnetically actuated means by the magnetic means. Each magnetically actuated means may comprise an electric switch operable by the magnetic means by passage of the magnetic means in proximity thereto during rotation of the wheel, the associated indicator being operated by said operation of the electric switch.

The magnetically actuated means may include time delay means to maintain an electric switch in an operated condition, after operation by the magnetic means, for a period of time at least equal to the time of revolution of the wheel at normal operating speeds of the vehicle.

Figure 2:
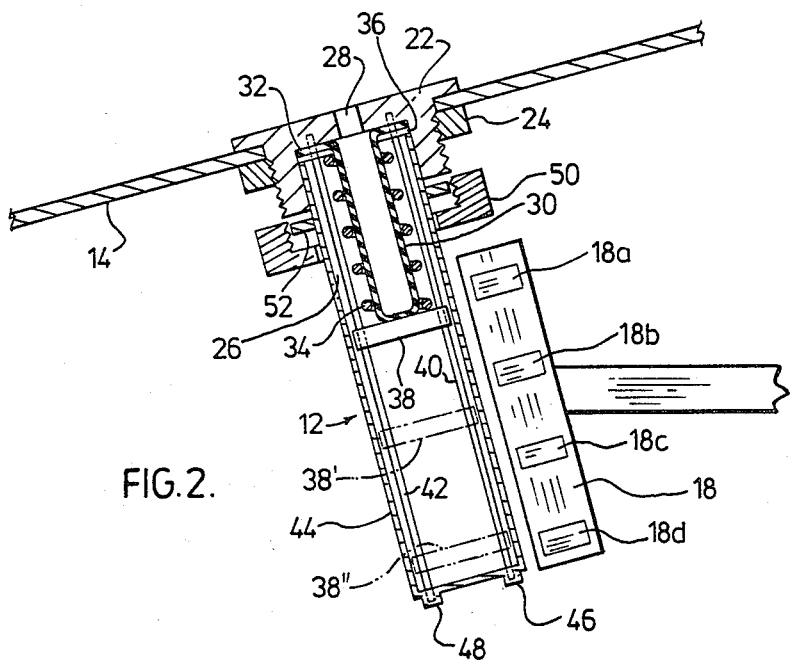
Figure 3:
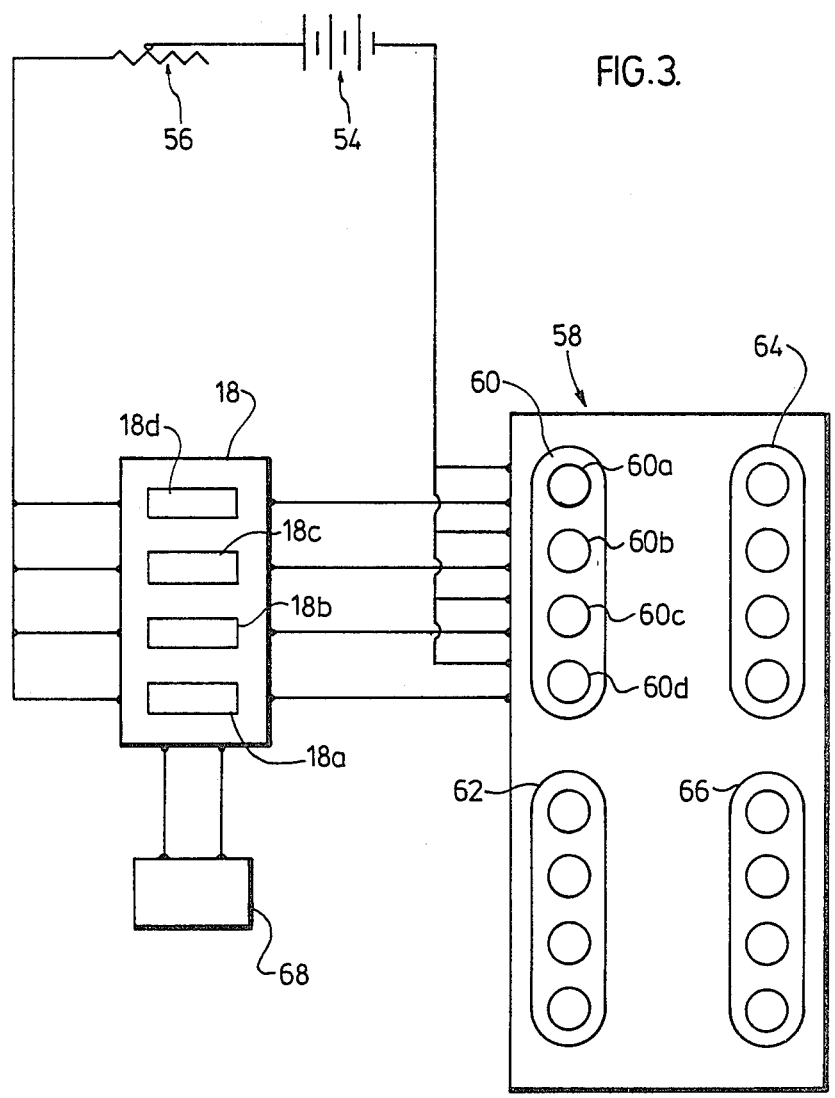

One embodiment of the invention will now be described, by way of example, with reference to the accompanying drawings, of which:

FIG. 1 is a diagrammatic view showing an actuator mounted on a wheel, and magnetically actuated means adjacent thereto, FIG. 2 is a longitudinal sectional view of the actuator with the magnetically actuated means also being shown, and FIG. 3 is an electrical circuit diagram showing the magnetically actuated means and the indicating means.

Referring to the accompanying drawings, apparatus for continuously indicating pressure in the pneumatic tires of the wheels of a vehicle while it is in motion comprises an actuator 12 secured to the rim 14 of each wheel, with the interior of the actuator 12 being in communication with the air in the tire 16 as will be described in more detail later and the actuator 12 extending substantially radially inwardly of the tire 16. A magnetic sensor 18 is mounted on a bracket 20 secured to an appropriate part of the vehicle and positioned near the path of the actuator 12.

Each actuator 12 comprises a connector 22 mounted on the wheel rim 14 and secured in place by a retaining nut 24. The connector 22 has a recess 26 in its outer side, and a bore 28 extends from the recess 26 to the inner side of the connector. An extendible bag member 30 having an open end with a peripheral flange 32 is mounted with its open end in the recess 26 adjacent the bore 28, with the flange 32 engaging the bottom of the recess 26 and with the major portion of the length of the bag member 30 projecting from the recess 26.

A coil spring 34 surrounds the bag member 30, and has a flange 36 at one end which engages the end flange 32 of the bag member 30. The other end of the spring 34 is secured to a magnet 38. A pair of rods 40,42 are each screw-threaded into the connector 22 at the bottom of the recess 26 and project from the recess 26, passing through apertures in the flanges 32,36 of the bag member 30 and spring 34 respectively. The magnet 38 has two bores through which the rods 40,42 pass so that the magnet 38 is slidably mounted on the rods 40,42. The magnet 38 is therefore movable by extension of the bag member 30 along a linear path extending substantially radially of the tire 16.

A cylindrical cover 44 surrounds the bag member 30, spring 34, magnet 38 and rods 40,42, and has an open end engaging the end flange 36 of the spring 34. The rods 40,42 pass through apertures in the closed end of the cover 44, and nuts 46,48 on the projecting ends of the rods 40,42 urge the cover 44 tightly against the end flange 36 of the spring 34 to ensure an air-tight connection between the bag member 30 and the connector 22. The cover 44 is also secured to the connector 22 by a nut 50 which engages a peripheral flange 52 on the cover 44.

Each sensor 18 has four magnetically actuated means in the form of electrical switches 18a, 18b, 18c and 18d, which are positioned adjacent the linear path of the magnet 38 in such a manner that, when the actuator 12 passes the sensor 18 during rotation of the wheel, the actuator 22 passes the sensor 18 in the manner indicated in FIG. 2. In other words, the switches 18a to 18d pass close to the actuator 12 and are spaced along the length of the actuator 12, with switch 18a being nearest the wheel rim 14 and switch 18d being furthest from the wheel rim 14.

Each sensor 18 is connected in an electrical circuit between the vehicle battery 54 and rheostat 56 on the one hand, and indicating means 58 on the dashboard of the vehicle on the other hand. The indicating means 58 has four lamp groups 60,62, 64 and 66, each associated with a respective wheel of the vehicle. One sensor 18 is connected to lamp group 60 as shown, and it will be understood that the other three lamp groups 62,64 and 66 are connected to sensors associated with the other three wheels of the vehicle.

Each lamp group has four indicator lamps, with lamp group 60 having indicator lamps 60a, 60b, 60c and 60d. The switches 18a to 18d of sensor 18 are respectively connected to indicator lamps 60a to 60d. Sensor 18 also includes a time delay 68 which, once any of the swtiches 18a to 18d have been closed, holds the switch closed for a predetermined period of time as will be described in more detail later.

When the vehicle is in motion, the actuator 12 on each wheel passes by the associated sensor 18 once in each wheel revolution. The magnet 38 in the actuator 12 will be positioned in accordance with the air pressure in the tire. For example, if the air pressure is relatively low, the magnet 38 will be positioned at approximately the position shown in FIG. 2, i.e. nearest to switch 18a on the side thereof remote from switch 18b. As the wheel rotates, magnet 38 comes into close proximity to switch 18a and closes the switch, with the result that lamp 60a is illuminated in the indicating means 58.

Time delay 68 holds switch 18a closed as the actuator 12 moves away from the sensor 18 as the wheel continues to rotate, it being arranged that time delay 68 will hold 18a closed for at least the time of one revolution of the wheel at a normal operating speed of the vehicle. Lamp 60a is therefore continuously illuminated, thereby warning the driver of low pressure in the associated tire.

When tire pressure is normal, the air pressure will have expanded the bag member 30 against the restoring force exerted by the spring 34 to move the magnet 38 to the position shown as 38' in dotted lines in FIG. 2. In this case, as the wheel rotates, both switches 18b and 18c will be actuated, with consequent illumination of lamps 60b and 60c. Illumination of these two lamps therefore indicates to the driver that the air pressure in the tire is at an optimum value.

If the pressure in the tire is too high, the air pressure will have expanded the bag member 38 against the restoring force exerted by spring 34 to position the magnet 38 at the position indicated as 38″ in FIG. 2. As the wheel rotates, switch 18b will be actuated, with consequent illumination of lamp 60d. Illumination of this lamp therefore indicates to the driver that air pressure in the tire concerned is undesirably high. The driver of the vehicle can thus see at a glance whether the air pressure in each tire of the vehicle is low, at an optimum value or high.

It will of course readily be understood that the actuator 12 is made from material which does not itself actuate any of the switches 18a to 18d, so that each switch is closed only by passage of magnet 38 in close proximity thereto.

Instead of the spring 34 surrounding bag member 30, the spring 34 may be embedded in the bag member 30. Advantageously, the electric switches 18a to 18d in the sensor 18 are contained in a housing of plastic material.

Other embodiments of the invention will be apparent to a person skilled in the art, the scope of the invention being defined in the appended claims.

What I claim as new and desire to protect by Letters Patent of the United States is:

1. Apparatus for indicating pressure in a pneumatic tire on a wheel while in motion on a vehicle, comprising an actuator secured to the wheel so as to rotate therewith, the actuator including an extensable bag member in communication with air in the tire, resilient means controlling extension of the bag member along a linear path extending substantially radially of the tire by air in the tire to cause the bag member to be extended by an amount indicative of the air pressure in the tire, and magnetic means positioned along said liner path in accordance with the amount of extension of the bag member and therefore in accordance with the air pressure in the tire, a plurality of magnetically actuated means mounted on the vehicle adjacent said linear path for selective actuation by the magnetic means of the actuator in accordance with the position of the magnetic means as it rotates with the tire, and indicating means connected to the magnetically actuated means to indicate air pressure in the tire by indicating the magnetically actuated means selectively actuated.

2. Apparatus according to claim 1 wherein the resilient means comprises a helical spring surrounding the extendible bag member and secured to the magnetic means, said spring acting to urge the magnetic means against the bag member to control extension of the bag member.

3. Apparatus according to claim 1 wherein the indicating means comprises a series of indicators each associated with a respective magnetically actuated means, each indicator being operated by actuation of a respective magnetically actuated means.

4. Apparatus according to claim 3 wherein each magnetically actuated means comprises an electrical switch operable by the magnetic means by passage of the magnetic means in proximity thereto during rotation of the wheel, the associated indicator being operated by said operation of the electric switch.

5. Apparatus according to claim 4 including time delay means operable to maintain each electric switch in an operated condition, after operation by the magnetic means, for a period of time at least equal to the time of revolution of the wheel at normal operating speeds of the vehicle.

* * * * *